United States Patent [19]

Kordik

[11] Patent Number: 5,592,057

[45] Date of Patent: Jan. 7, 1997

[54] STEP MOTOR AND SERVO MOTOR INDEXER

[75] Inventor: Jeffrey A. Kordik, Watsonville, Calif.

[73] Assignee: Applied Motion Products, Inc., Watsonville, Calif.

[21] Appl. No.: 494,165

[22] Filed: Jun. 23, 1995

[51] Int. Cl.$^6$ ........................................ H02P 8/00
[52] U.S. Cl. ............................ 318/162; 318/558; 318/696
[58] Field of Search .......................... 318/162, 558, 318/561, 567, 685, 696

[56] References Cited

U.S. PATENT DOCUMENTS

4,636,884  1/1987  Hattori et al. .
4,687,978  8/1987  Hayashida ........................... 318/599

*Primary Examiner*—Bentsu Ro
*Attorney, Agent, or Firm*—Raymond E. Roberts; Michael J. Hughes

[57] ABSTRACT

A step motor and servo motor indexer (10) having an improved user interface (14) wherein an input capability for programming a full range of program parameters and values is provided, yet where the user input system (20) has few components. The user input system (20) for programming the indexer (10) is characterized by having a data entry unit (26) which includes only a toggle device (27) and a rotary device (28), both of which may be combined into a single component part. In addition to the typical turned clockwise and turned counter clockwise modes of the rotary device (28) the use of the rate of rotation permits an additional input mode which is used to accomplish rotational or software ballistics to input large ranges of values during programming of the indexer (10). The user interface (14) further includes a display (22), for presenting program choices and values to user during programming, and for reporting running parameters. The indexer (10) further includes a stop button (24) to halt operation of the indexer (10) when it is running.

21 Claims, 5 Drawing Sheets

STEP MOTOR AND SERVO MOTOR INDEXER

TECHNICAL FIELD

The present invention relates generally to control systems for electrical motors, and more particularly to user interfaces for indexers used to control step and servo motor systems.

BACKGROUND ART

A great variety of motors have been developed to meet the needs of mechanized industry. Today, two of the most widely used motors for precise repeatable tasks are the step motor (also commonly called a stepper or stepping motor) and the servo motor. Since servo motor systems usually can be applied to similar tasks as step motor systems, but the converse is not always true; and since only some servo motor systems can use step motor control equipment (e.g., indexers) the discussion here will concentrate on step motor systems and controls. However, it should be appreciated that where a step motor indexer could be applied in a servo motor system the following discussion also applies.

In a step motor the normal shaft motion consists of discrete angular movements of essentially uniform magnitude, when driven from a sequentially switched direct current (DC) power supply. Thus, step motors are digital input-output devices which in response to a switched current state will rotate the shaft of a step motor a fixed angular amount. This makes step motors particularly well suited to control by modem digital electronics, such as computer microprocessors. Today, a step motor system will generally contain three discrete major units: a motor, a driver, and a controller. The motor, like most motors, is a construct of magnetically permeable materials and windings of electrically conductive wire. The driver is an assembly of electronics, primarily electronic switching components. The inputs of a driver are electrical power, step signal pulses, and an optional motor rotation direction signal. The outputs of a driver are digital pulses of sufficient current and voltage to cause, or inhibit, motor shaft movement. Both motors and drivers are well known art, and are not the subject of this invention.

The present invention relates to controllers, or indexers as modem more complex variations of step controllers have come to be called. It is the function of a controller or indexer to provide the driver with the step pulse signals, and the optional direction signal. By changing the signal outputs to the driver an indexer can effect the mechanical action of a motor in numerous ways. By providing a constant step signal (i.e., pulse frequency of zero) an indexer sets a fixed rotational angle that a motor shaft will be held at. By providing a series of step pulses at a constant frequency an indexer can set a motor shaft rotation speed. Similarly, by increasing or decreasing the frequency of step pulses, an indexer can respectively accelerate or decelerate the rate of rotation of a motor shaft. And, by changing the state of the direction signal an indexer sets a direction of motor shaft rotation.

A number of electrical systems have proven suitable for use in controllers and indexers. Early controllers used "hard-wired" electronics, which often were integrated with the driver. Effectively, such primitive controllers had no "program," and any required decision making would be done by a human user, or by the actuation of common electrical limit switches and relay logic residing outside of the controller. The next generation of controllers had limited programming capabilities, via input of operating parameters with thumb-wheel switches. It was at this stage of development that controllers started to be called indexers, because of the ability they provided to "index" motorized mechanical operations (i.e., to "dial in" or precisely set positions). However, major utilization of step motor systems was not to occur until computer and micro-processor based control systems became available. Today the vast majority of indexers use electronic micro-processors, which a user or technician programs with a keyboard (or a keypad, which will be regarded as effectively the same here). The digital electronic signal levels, high speeds, and large memory capacities of micro-processor circuitry have proven very well suited for building indexers capable of guiding motor systems through very complex sequences of motor shaft orientations, variations in speed, reversals of direction, and accelerations.

To utilize the considerable flexibility which modem step and servo motor systems are capable of, indexers need to be programmed. The method of inputting a program has become one way to classify the sophistication of a system. Thus, one manner by which indexers have come to be designated is by the nature of their "user interface." Hard-wiring and thumb-wheel switches, respectively, can be considered to be the first two generations of user interfaces. Today, keyboards can be considered to be the third generation. Arguably a fourth generation now exists which includes indexers with computer port communications interfaces and integrated indexer-driver electronic boards, for plugging directly into a computer bus system. However, a probably better view is that these are merely third and a half generation systems, since the ultimate user interface remains a keyboard, which is merely separate from the indexer itself.

Unfortunately, even keyboard user interfaces have their drawbacks, as most personal computer users will readily testify. They are often physically large in size, relative to the size of the actual operable electronics being programmed. They require some degree of user familiarity with key functions and key locations for efficient use (basically the trained typist vs. the hunt-and-peck typist analogy). And, the plethora of key choices which they offer tends to promote poor program design practices, such as over utilizing key variety and compelling unnecessary or redundant user input. Further, use of keyboards is currently subject to considerable legal debate, due to unresolved medical questions about keyboard ergonomics. Therefore, analogous to the search for better user interfaces for the growing complexity of personal computer applications, there is today a search for better indexer user interfaces, due to the growing complexity of step and servo motor systems and the applications which they are called upon to perform.

DISCLOSURE OF INVENTION

Accordingly, it is an object of the present invention to provide an ergonomically improved step and servo motor indexer user interface which is easy to use, uses logical command sequences, uses intuitive command structures, which facilitates efficient communication between user-programmers, and for which both the commands and programmed command structures are easy to learn and remember.

Another object of the invention is to provide a user interface which focuses step and servo motor system designers and users on the ultimate application of the step or servo motor system, rather than on the tool (i.e., the indexer) being used to perform that application.

And, it is an object of the invention to provide a step and servo motor indexer user interface which is small and which uses few parts, thus permitting construction of more economical indexers.

Briefly, a preferred embodiment of the present invention is an indexer for use in step or servo motor systems. The indexer includes a user feedback unit, which may be a liquid crystal display (LCD) or some other suitable display, and a data entry unit.

The data entry unit is novel in its ability to provide full user interface programming functionality while using as little as one physical component, a combined toggle device (e.g., a push-button) and rotary device (e.g., a shaft-position encoder, a potentiometer, a rotary switch, a resolver, or a tachometer).

An optional point of additional novelty in the data entry unit is the use of a rotary device having shaft position retaining capability (e.g., multiple detents, or high static shaft friction), yet which remains capable of rotation at a wide range of speeds. This position holding capability eliminates the need for adding control hysteresis to handle potential "hunting" between two adjacent increments when the data entry unit is left at a border position. Hunting is characterized by a control system dithering repeatedly back and forth between two choices or values representing adjacent input device positions. Note that in the current context such hunting would merely be between programming choices, rather than operational hunting in a running step or servo motor system. Failure to provide for programming input device hunting can result in inadvertent user input of an adjacent, but wrong, program choice or value. Thus, avoiding hunting is clearly an important goal. One common way to provide control hysteresis is with software hysteresis routines. Unfortunately, hysteresis handling, by whatever means, inherently adds a lag to system responsiveness which users perceive and often find irritating. Therefore, avoiding control hysteresis entirely is also a goal, although not a necessary one.

A key point of novelty in the user interface data entry unit is the use of a wide rotation speed range to permit the use of rotational ballistics as a "software ballistics" programming input. While the user interface data entry unit has only two mechanical actions, press and ram, it is capable of four basic electronic inputs: press, mm clockwise, mm counter clockwise, and rate of ram; and it is capable of additional types of inputs by combining these basic four types.

For running operation, the indexer further includes a stop control to allow users to halt indexer step pulse output, and thus halt motion of the step or servo motor system. Optional indexer capabilities which the stop control may also be used for include use as an additional input unit when the indexer is being programmed (e.g., as an abort or restart programming command input device), and use as a start/stop control, either auxiliary to or in place of an external trigger system.

An advantage of the present invention is that it may be implemented to function ergonomically. Despite being vertically mounted, in the manner typical for electrical controls in general and motor controls in particular, the invention permits efficient placement of the user feedback and user input portions of the invention in close proximity. Thus, in a typical application in an industrial setting, users are not forced to view feedback from an awkward angle, such as downward. Nor are users forced to move their wrists or hands in manners, such as typing, which are awkward when performed on a vertical surface.

Another advantage of the invention is that it is simple to operate, and promotes easy learning of its operation. Thus, less sophisticated personnel may use the invention, training times for all users are reduced, and user technology based phobias and intimidation are more easily overcome. Further, since simplicity of operation and ease of learning both inherently promote better comprehension, users confidence and mental retention of how to operate the invention are increased. All of these benefits lead to shorter installation times, reduced production line changeover time, and less maintenance downtime. Indirectly, material scrappage and tooling breakage may also be reduced.

And another advantage of the invention is that it may be implemented in small form. Therefore, only a small "footprint" and volume are needed in which to mount the invention. Typically such mounting will be on or within electrical panelwork, where mounting surface and space are limited, and where area and volume generally correlate to the expense of the overall system. Thus, the possible small size of the invention, aside from reducing the cost of manufacturing the invention, may reduce the costs of the systems in which it is used.

Yet another advantage of the invention is that it may be implemented in a form using few parts, of which particularly few must be moving parts. This makes the invention economical to manufacture. Further, this correlates to the invention requiting less maintenance or less frequent replacement, since general industrial experience is that decreased parts count in general, and particularly decreased moving parts count, results in decreased points of wear and failure, which in mm lead to increased reliability.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
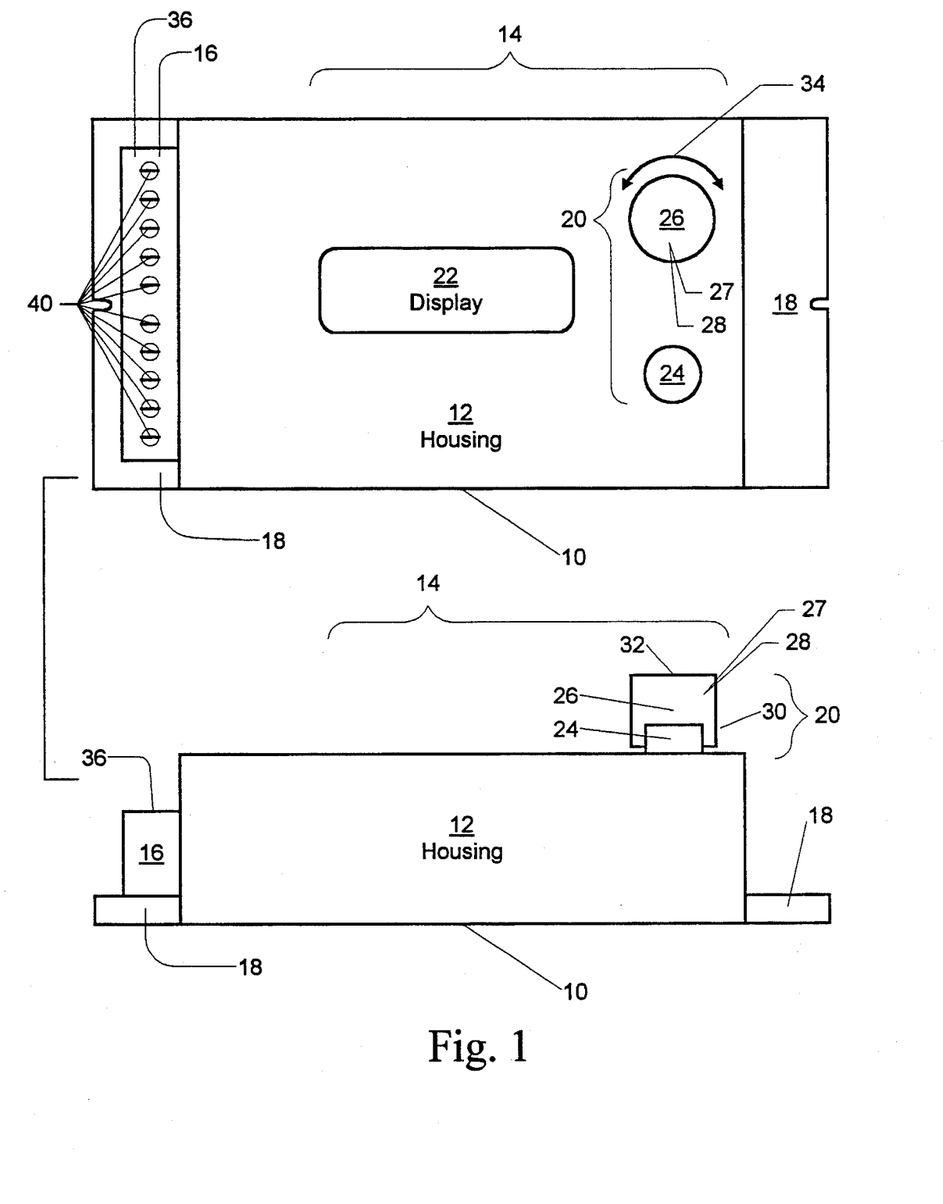
FIG. 1 is a diagrammatic plan and elevation view of the exterior of a preferred embodiment of the invention.

The preferred embodiment of the present invention is a step or servo motor indexer adapted to use an ergonomic minimum of user controls, yet provide enhanced flexible task programing capability through the use of software ballistics. As illustrated in the various drawings, and particularly in the view of FIG. 1, a basic form of the preferred embodiment of the invention is depicted by the general reference character 10. FIG. 1 shows an exterior view of a preferred embodiment of the inventive indexer 10 which includes a housing 12, a user interface 14, and an input/ output "I/O") port 16.

Physically and functionally the housing 12 of the indexer 10 is generally conventional. It has suitable shape, dimensions, and openings, and it may be made of similar materials as are all common in the art of housings for electronics assemblies. In FIG. 1 the housing 12 is shown having brackets 18, to permit mounting of the indexer 10 in or on conventional electrical panelwork. Due to the reduced number of components in the indexer 10 (discussed further below) the housing 12 may accordingly have smaller dimensions than prior art indexers of equivalent power. Similarly, due to the reduced component count in the user interface 14 (also discussed further below) the housing requires fewer and smaller openings than are typical for prior art indexers. The major purposes of the housing 12 are to hold the other components of the indexer 10 in suitable spatial relationship and to provide physical protection for them. Additional functions of the housing 12 include electrical and magnetic shielding, heat sinking, and heat dissipation.

The user interface 14 of the indexer 10 consists of a user input system 20 and a display 22. A key aspect of the present invention is the novel use of few physical components in the user input system 20. In the current preferred embodiment the user input system 20 consists of only a stop button 24 and a data entry unit 26.

The stop button 24 of the user interface 14 is an entirely conventional electrical spring return push button. While termed a "button" here, due to overwhelming industry usage of push buttons to perform stop functions, there is no reason other devices could not be substituted. For example, an external stop system could be provided, without deviating from the inventive spirit of the indexer 10. In contrast to the data entry unit 26, the stop button 24 in the current preferred embodiment of the indexer 10 has no programming affect. It is used only to interrupt the indexer 10 when it is providing signals to a driver in a step motor system. It should, however, be appreciated that the stop button 24 could be used for additional functions, for either the running or the programming states of the indexer 10. For example, the stop button 24 could be used as a combined start/stop button, eliminating the need for an external trigger system to start the indexer 10. (Examples of programming uses are provided below.)

Figure 2:
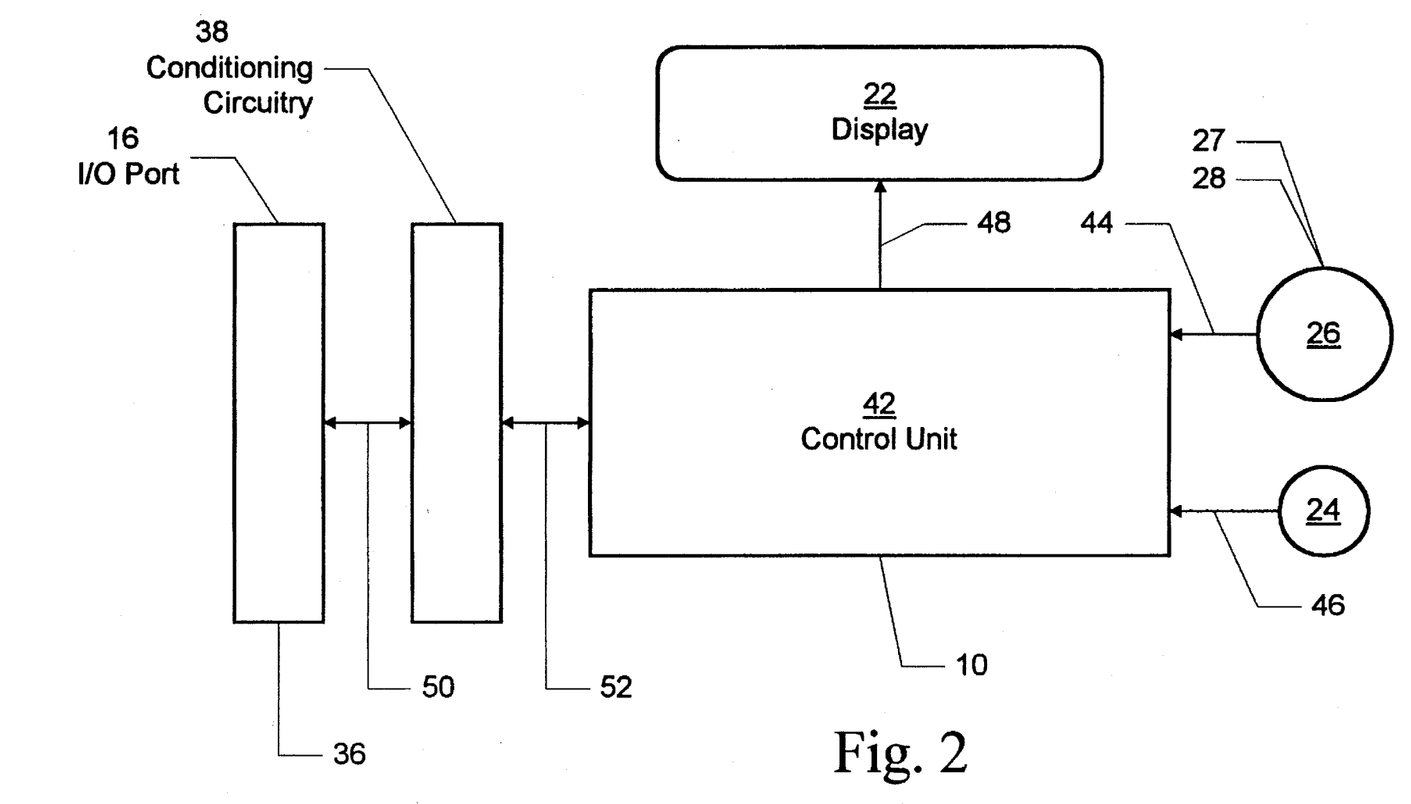
FIG. 2 is a block diagram showing relationships of the major functional components of the preferred embodiment of FIG. 1, including major signal interconnections between those components.

The data entry unit 26 of the user interface 14 consists of a toggle device 27 portion, and an rotary device 28 portion (both depicted in FIG. 2). In the preferred embodiment of the indexer 10 the toggle device 27 and the rotary device 28 are combined into one physical component. All following discussion will reference the data entry unit 26 as a single component, although it should be appreciated that the use of separate toggle device 27 and rotary device 28 components is possible. The data entry unit 26 is generally contained within the housing 12 but further includes a projection 30 (depicted in FIG. 1), which projects outside of the housing 12, where it is accessible to a user. Users operate the data entry unit 26 by either (1) grasping and rotating the projection 30 in a knob like manner to employ the rotary device 28; or by (2) pressing in a button like manner a top surface 32, provided on the projection 30 for that purpose, to employ the toggle device 27. Clockwise "CW") and counter clockwise "CCW") rotation of the projection 210 are possible, and this is depicted by a bi-directional arrow 34.

A key aspect of the inventive indexer 10 is the use of the data entry unit 26, a single physical component, to provide four basic input functions: pressed, rotated CW, rotated CCW, and rate of rotation. While not currently used in the preferred embodiment, it should also be appreciated that additional input functions are possible. Examples include a period pressed function, a pressed while rotated CW function, a pressed while rotated CCW function, or even combinations of these with rate of rotation. In the preferred embodiment of the indexer 10 the rotary device 28 portion of the data entry unit 26 is chosen having conventional rotational detents (32 total), to provide positive stopping and holding of data entry unit 26 rotational position. It should also be appreciated that other ways (e.g., friction mechanisms) for retaining the data entry unit 26 rotational position are also suitable. Various motivations exist for positively controlling the data entry unit 26 in this manner. For example, providing tactile feedback to a user; or preventing typical manufacturing environment vibration from causing spurious changes when the data entry unit 26 is left at border positions, which might result in inadvertent user input of a program setting adjacent to one desired. A key motivation for the inventor was eliminating hysteresis control programming in the control unit 42 (described below) to facilitate application of the software ballistics style of programming (also described below), as well as to prevent the above effects. Finally, in the current embodiment of the indexer 10 the data entry unit 26 is used to commence, carry out, and terminate programming of the indexer 10. When the indexer 10 is in a running state and is controlling an active step or servo motor system the data entry unit 26 has no effect.

The display 22 of the user interface 14 is generally conventional, and numerous suitable and commercially available units exist. The function of the display 22 is to present messages to users of the indexer 10. In the preferred embodiment a two line, 16 character per line, liquid crystal display "LCD") is used its for simplicity, low power consumption, and low cost. Other types of displays may also be used for specialized embodiments of the inventive indexer 10. For example, a plasma dot matrix display might be chosen for enhanced user visibility in applications where low ambient light levels exist.

The I/O port 16 of the indexer 10 includes a conventional terminal block 36, which projects outside of the housing 12 (visible in FIG. 1 ), and signal conditioning circuitry 38, located inside the housing 12 (represented in FIG. 2). The terminal block 36 has conventional screw terminal points 40, suitable for termination of wiring carrying signals and power into and out of the indexer 10. The conditioning circuitry 38 is conventional and performs typical motor control related electronic functions, examples of which include: power conditioning (e.g., direct-current tipple filtering, voltage limiting, and voltage spike suppression), signal isolation (e.g., opto-isolation of external signals controlling indexer 10 operation), and output signal amplification. It should also be appreciated that communications type capabilities can be added to the indexer 10 by providing suitable connection capability at the I/O port 16 and by also providing suitable capabilities in the conditioning circuitry 38 and the control unit 42. Such communications ports and capabilities are common in the art of general motor control to permit, for example, remote programming, offline program storage, and collection of system use statistics, however further discussion of such would add nothing to the spirit of the invention being disclosed here.

Further depicted in FIG. 2 is a control unit 42. Physically and electronically this is also entirely conventional, being merely a construct of widely available electronics components, including in the preferred embodiment one microprocessor integrated circuit which has internal programmable memory. Further discussion of these aspects (as contrasted with the programming of the control unit 42, described extensively below) adds nothing to the spirit of the invention being disclosed here.

FIG. 2 illustrates the major functional relationships of the component parts of the indexer 10. In addition to the component parts, discussed above, FIG. 2 further depicts a data signal group 44, a stop signal 46, a display signal 48, a raw I/O signal group 50, and a conditioned I/O signal group 52. To facilitate discussion, signals and signal paths will be referred to synonymously here. In FIG. 2 directed lines represent these signals and paths, with the arrowheads on the lines representing flow of signal content. As can be appreciated from FIG. 2, the data entry unit 26 transmits the data signal group 44 to the control unit 42; the stop button 24 transmits the stop signal 46 to the control unit 42; the control unit 42 transmits the display signal 48 to the display 22; the I/O port 16 and the conditioning circuitry 38 communicate the raw I/O signal group 50; and the conditioning circuitry 38 and the control unit 42 communicate the conditioned I/O signal group 52.

Figure 3:
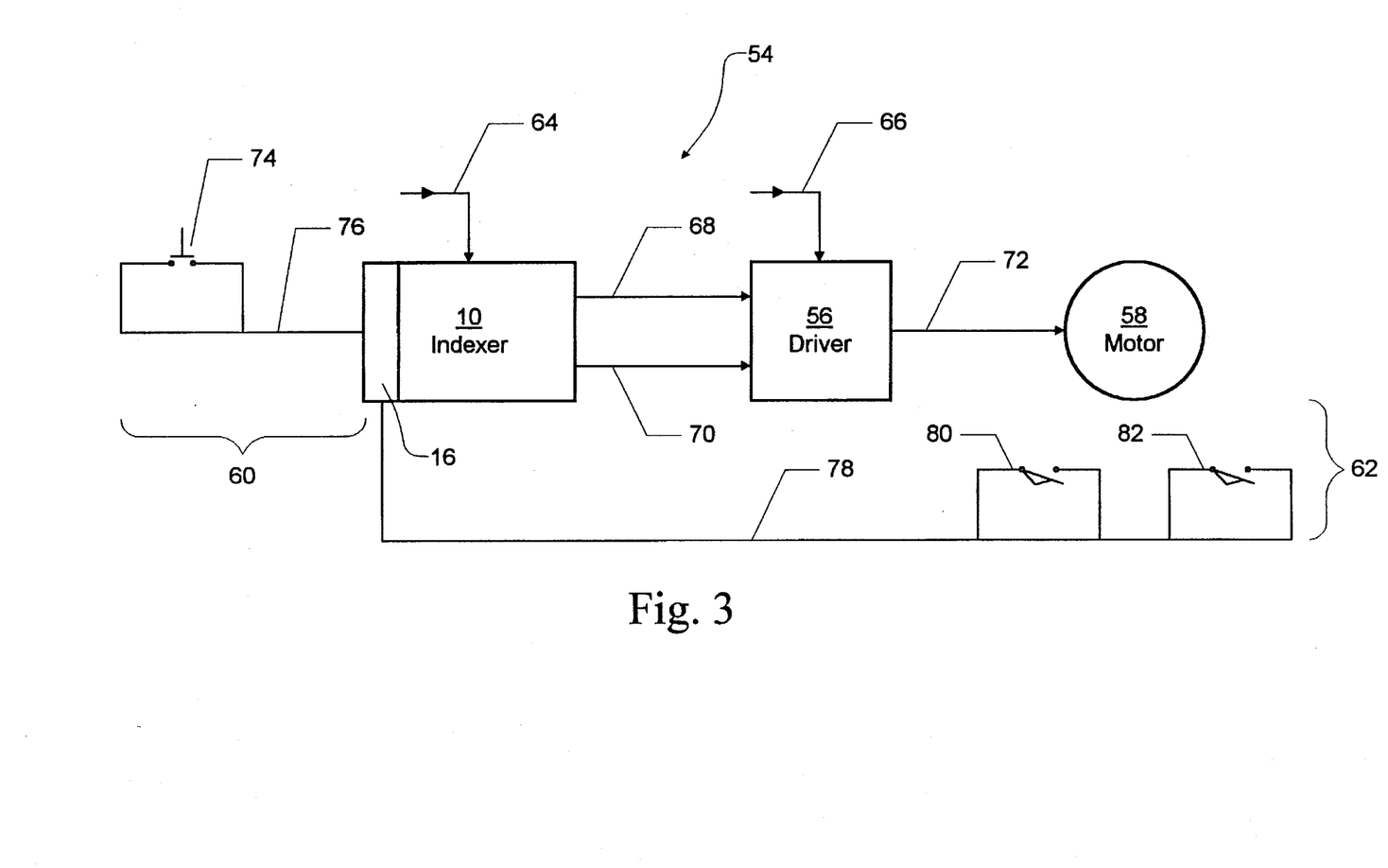
FIG. 3 is a block diagram of a typical step motor system using the embodiment of FIG. 1, including typical major signal interconnections.

FIG. 3 illustrates the use of the indexer 10 from the global perspective of a typical step motor system 54. In addition to the inventive indexer 10, the step motor system 54 includes a driver 56, a motor 58, a trigger system 60, and a limits system 62. Power sources are not show in FIG. 3. Instead a first power feed 64, to the indexer 10; and a separate second power feed 66, to supply the driver 56, are depicted. It should be appreciated that the first power feed 64 and the second power feed 66 may come from the same power source, but in most applications will not, since the power needs of the indexer 10 are quite low while those of the driver 56 (which supplies power to the motor 58) are higher and likely to be of a different nature (i.e., different voltages and currents). FIG. 3 also depicts a step signal 68, a direction signal 70, and motor signals 72. (As in FIG. 2, signals and signal paths are treated synonymously here with depictions as directed lines representing signal flow.) For illustrative purposes, FIG. 3 depicts the trigger system 60 as a simple mechanically actuated electrical contact 74 (e.g., a start push button) connected by a trigger bus 76 to the I/O port 16 of the indexer 10. Similarly, the limits system 62 is depicted in FIG. 3 as a limits bus 78 connected to a first limit switch 80 and a second limit switch 82. The first limit switch 80 is used to cease system rotational travel in one direction (e.g., clockwise) yet not affect opposite travel (e.g., counterclockwise), while the second limit switch 82, similarly, permits and cease opposite travel (e.g., halt further counterclockwise movement yet permit "return" clockwise movement). It should be appreciated that while the trigger system 60 and the limits system 62 have been illustrated here in simple forms, and that complex control systems comprising multiple contacts or semiconductor switches under micro-processor control are equally suitable. Similarly, complex auxiliary input and feedback components may be added to indexer 10, to create more complex step motor systems, but would add nothing to the spirit of the invention being disclosed.

Once power is supplied, operation of the step motor system 54, portrayed in FIG. 3, begins when the trigger system 60 is enabled, and when the limits system 62 permits (concepts elaborated on below). The indexer 10 then transmits the step signal 68 and the optional direction signal 70 to the driver 56. Operation of the step motor system 54 stops, due to cessation of the step signal 68, when either the limits system 62 is enabled or when a user presses the stop button 24. Once the stop button 24 has been pressed the step motor system 54 can not be restarted until the trigger system 60 enables it again. To prevent unintentional restarting of the step motor system 54, for example if the trigger system 60 is held in an enabled state, the preferred embodiment requires a high-to-low signal transition (i.e., the step motor system 54 can not restart until the trigger system 60 is de-enabled, and then re-enabled again).

A separate figure detailing the use of the inventive indexer 10 in a servo motor system has not been provided here. However, those skilled in the art will readily appreciate that such a system would be analogous to that of FIG. 3, and hence that provision of an additional figure along with description of it for a servo motor system would be merely tedious repetition.

The stop button 24 of the indexer 10 (depicted in FIG. 1 and FIG. 2) may be particularly useful during initial operation and set-up of the step motor system 54, (or a servo motor system) when testing of programming is carded out or "debugged." By repeated operations of the trigger system 60 and the stop button 24 a user can "jog" or "walk" the step motor system 54 through a programmed sequence of operations. If errors or problems are observed a user may press the stop button 24 to halt the output of the step signal 68, and hence the step motor system 54, before damage or injury occurs.

Figure 4:
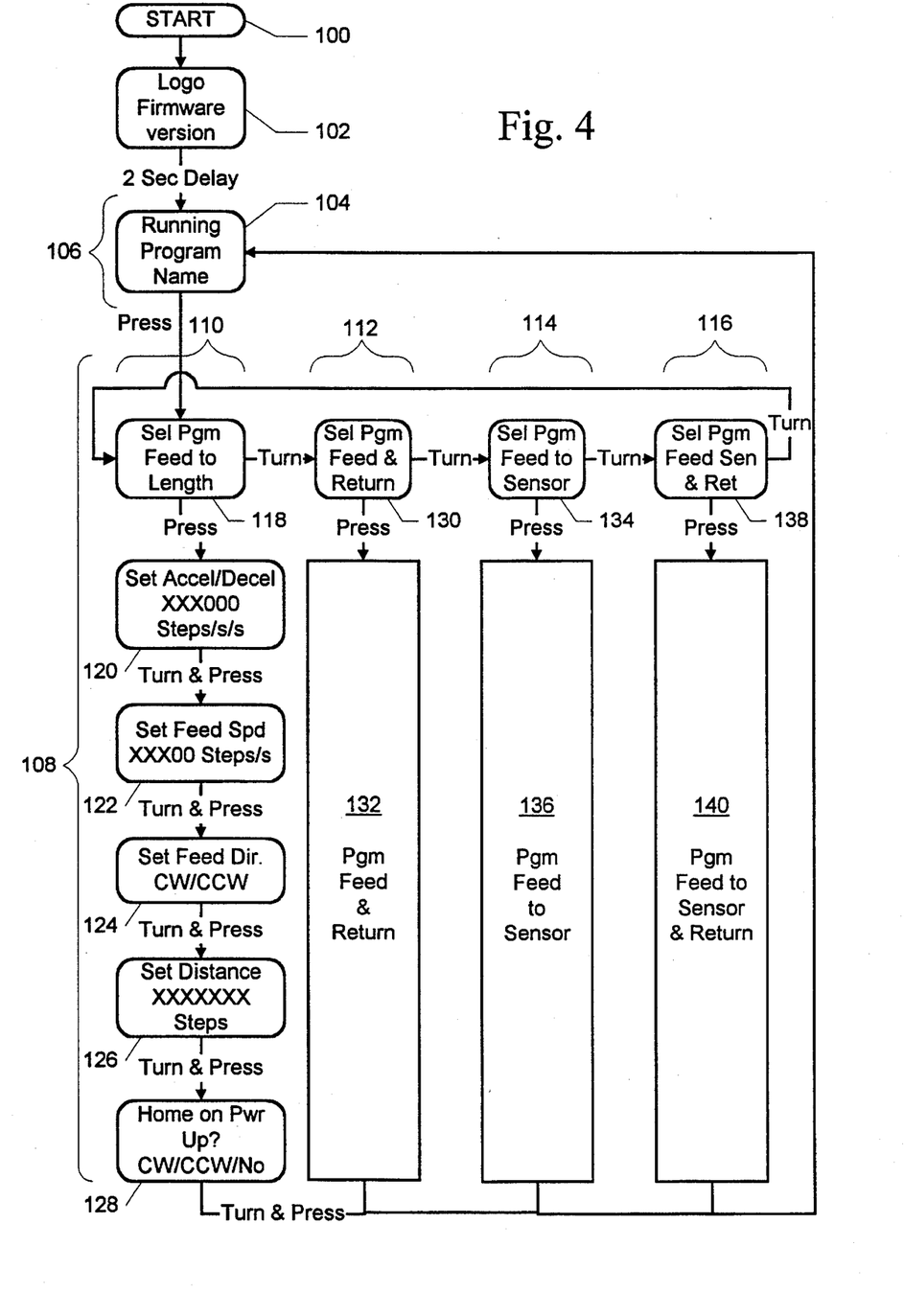
FIG. 4 is a flow chart of a suitable control program for operating the preferred embodiment of FIG. 1.

FIG. 4 is a flow chart of a typical programming operation for the inventive indexer 10. As can readily be appreciated, the programming in the portrayed embodiment is entirely menu driven, and a user need learn no programming language. This novel aspect of the indexer 10 provides complex industrial control capabilities without the need for personnel which have specialized computer talents. Programming the inventive indexer 10 is thus well within the capabilities of typical industrial maintenance personnel. It should be appreciated that addition of a programming language capability may be added to the invention. One example would be to add a communications port to the I/O port 16, add communications capability, and suitably enhance the firmware and memory of the control unit 42, to permit remote writing of generic new programs which are then downloaded into the indexer 10, for local set-up programing by users with the user interface 14 of the indexer 10.

Turning now to the steps of the flow chart in FIG. 4, when the indexer 10 is first supplied power the flow chart is entered at step 100 (START). In the preferred embodiment the control unit 42 performs self diagnostics and on successful completion step 102 is executed and the display 22 shows general information such as the indexer 10 manufacturer's identification and the version number of the firmware in the control unit 42. After a slight delay (e.g., 2 seconds, which is sufficient for a user to read the display 22) the indexer 10 then automatically executes step 104, where the display 22 shows the name of the program currently running (which will be the program which was running last before power was removed). At step 104 the indexer 10 is in a run mode 106, which can be viewed as having two states: a quiescent state when the indexer 10 is waiting for enablement from the trigger system 60, and an active state when the indexer 10 is executing a preprogrammed sequence of steps which direct step signal 68 and direction signal 70 output. On power-up, depending on whether a home-on-power-up command was part of the last running program (e.g., step 128, described below), the indexer 10 at step 104 will be in the quiescent state of the run mode 106, or temporarily enter the active state of the run mode 106 to direct the step motor system 54 to a "home" position before then entering the quiescent state.

A limited number of choices are possible from the quiescent state of the run mode 106: the indexer 10 can be powered down, with the above steps repeating at a subsequent power-up; the trigger system 60 may be enabled and the indexer 10 may enter the active state of the run mode 106, where a program is executed (entry of a typical program and execution of that program are described below); or, a user may push the top surface 32 of the projection 30 of the data entry unit 26, and the indexer 10 will enter a program mode 108. In the current preferred embodiment, pressing the stop button 24 has no effect when in the program mode 108 and during the quiescent state of the run mode 106. However, this is a mere design choice, and no reason is envisioned why this could not be used in other embodiments. For example, to abort programming entirely and return to the run mode 106, or to terminate programming at a middle stage and restart.

In the embodiment of the indexer 10 portrayed in FIG. 4, four generic programs titled Feed-to-Length 110, Feed-and-Return 112, Feed-to-Sensor 114, and Feed-to-Sensor-and-Return 116 are available. Once the program mode 108 is entered the indexer 10 proceeds to step 118, where the display 22 presents the title of the first generic program, Feed-to-Length 110. If a user wishes to select a different generic program the projection 30 of the data entry unit 26 may be rotated, CW to scroll through choices in one order and CCW to scroll through them in the opposite order, until the display 22 shows the desired generic program title. Selection of a specific generic program is made by pressing the projection 30 when the title for that program is displayed. Similarly, accepting any displayed choice, whether it be a numeric value or an enumerated choice, and then proceeding on to the next step within a generic program is accomplished by pressing the top surface 32 of the projection 30. For example, repeatedly pressing the projection 30 while at step 118 proceeds to step 120, step 122, step 124, step 126, step 128, and, finally, out of program mode 108 and back into run mode 106 at step 104. In like manner, pressing at step 130 proceeds to step 132, pressing at step 134 proceeds to step 136, and pressing at step 138 proceeds to step 140. FIG. 4 depicts step 132, step 136, and step 140 as mere sequences in gross, since the operations of Feed-and-Return, Feed-to-Sensor, and Feed-to-Sensor-and-Return which they portray are typical industrial operations, and any detailed discussion of them would not add any disclosure relevant to the inventive spirit of the indexer 10.

Figure 5:
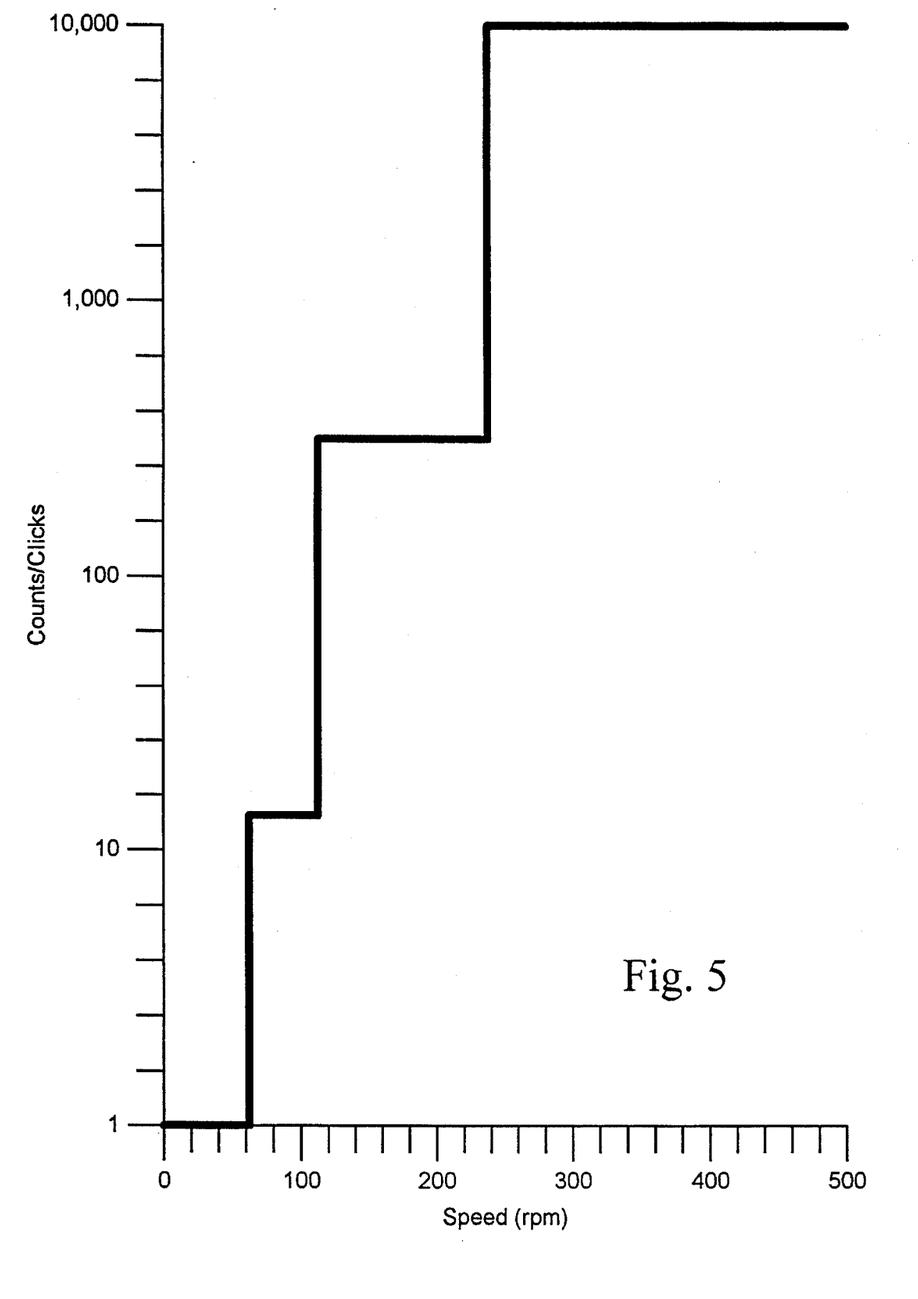
FIG. 5 is graph of a the ballistic relationship between the rate of an user's rotation of the input unit knob and the increments of input accepted by the inventive indexer.

For modern step and servo motor systems, capable of operations programmable across a large range of values, it may readily be appreciated that equating one input value increment to one full projection 30 rotation would require tedious user rotations for most values. For example, the current preferred embodiment of indexer 10 is capable of distances programmable across 1 to 8,000,000 steps; speeds programmable across 100 to 25,000 steps per second; and accelerations programmable across 1,000 to 255,000 steps per second per second. Similarly, it follows that equating thousand value increments to a full rotation of projection 30 would require tedious user attention to minute increments of rotational arc if entry of precise values was desired. To overcome such tedium, a key point of novelty in the inventive indexer 10 is the use of "software ballistics." In the preferred embodiment the rotary device 28 portion of the data entry unit 26 is chosen to provide 32 mechanical detent positions corresponding to 32 input increments for each full rotation of projection 30. To input numerical values a user rams the projection 30 to create "clicks" at the data entry unit 26 which are translated into increments of information transmitted to the control unit 42 as part of the data signal group 44. The control unit 42 calculates the rate of the clicks and direction of projection 30 rotation (CW for increment and CCW for decrement) and applies a scaling function to accumulate a value, which is presented on the display 22 for user feedback and confirmation. FIG. 5 is a graphical representation of the relationship between projection 30 rotation speed (in revolutions per minute; on the X axis) and counts per click (on the Y axis). For programming steps requiring a value input, it may be seen from FIG. 5 that the faster a user rams the projection 30 the higher the value input. For example, at 50 RPM one full revolution of the projection 30 will produce 32 clicks which will be scaled at a rate of one count per click and accumulate as a value of 32. But, at 400 RPM one full revolution of 32 clicks will be scaled at a rate of 10,000 counts per click and accumulate as a value of 320,000. It should be appreciated from the preceding that rotary device count scaling with software ballistics is markedly different from user interfaces of prior art indexers, which have relied on multi-decade thumbwheel switches or full numerical keypads for inputting high increment values.

Returning to FIG. 4, and examining the generic program Feed-to-Length 110, beginning at step 118, a user presses the data entry unit 26 to proceed to step 120 where collection of specific operating parameters for the generic program begins. At step 120 the display 22 requests that an acceleration/deceleration rate be given, in units of 1,000 steps per second squared. As described, above, this is easily done, and when the user has input a desired value, which is presented on the display 22 for confirmation, the user presses the projection 30 to enter that acceleration/deceleration rate value. Next, at step 122, a speed value (in 100 steps/sec increments) at which the step motor should run is requested (a user would likely term this rate of feed, since this is Feed-to-Length application). This is entered in the same manner as the value was in step 120, above. Next, at step 124, a direction of motor rotation (CW or CCW) is requested. This is specified by turning the projection 30 (either direction) to scroll through choices until the desired one appears on the display 22, and then pressing the projection 30 to enter that choice. Next, at step 126, a distance of rotation (i.e., feed amount in this Feed-to-Length application) value representing total steps of rotation is entered. Finally, at step 128, inquiry is made about how the indexer 10 is to perform on power-up: should it accelerate, run until the CW limit is reached, decelerate, and enter the quiescent state of the run mode 106; should it do the same, only in a CCW direction; or should it merely enter the quiescent state of the run mode 106 directly. Similar to step 124, where the run direction was set, the user rotates the projection 30 to scroll through choices on the display 22 and then presses the projection 30 to enter a selection. This press of the projection 30 also takes the indexer 10 out of the program mode 108 and back to step 104, where it is in the quiescent state of the run mode 106.

In addition to the above mentioned examples, various other modifications and alterations of the indexer 10 may be made without departing from the invention. Accordingly, the above disclosure is not to be considered as limiting and the appended claims are to be interpreted as encompassing the entire spirit and scope of the invention.

INDUSTRIAL APPLICABILITY

The indexer 10 according to the present invention is adapted for use with drivers, step motors, and servo motors as are currently used in mechanized industry, and as it is reasonably anticipated will continue to be used for some time. The inventive indexer 10 is highly ergonomic because it is well suited for mounting at a great range of mounting heights or angles, and particularly for conventional vertical mounting at eye level in or on electrical panelwork. The user input portion of the user interface makes this indexer 10 desirable because it is more easily manually operated than other devices, such as, for example, devices using keyboards.

The inventive indexer 10, from a user's perspective, is simple in operation and therefore easy to learn to use. This makes the inventive indexer more economical to use due to the ability to utilize less skilled and experienced installation and operations personnel, and also due to reduced overall system downtime when setting-up or re-configuring indexer 10 programming for a new application or production run.

Further, the indexer 10 may reduce overall costs in systems where it is used through its reduced need for mounting surface or volume. Less expensive electrical panel space is required by the inventive indexer. And, the indexer may in some situations fit into space where another, larger, device would not fit. Thus the inventive indexer 10 may be a preferred choice in situations where more remote mounting would entail additional cost, for example for cabling, or where remote mounting might cause safety concerns.

Further, due to its low parts count the indexer 10 is both economical and reliable since reduced part interconnection and wear points lead to reduced failures and since fewer spares need be stocked.

For the above, and other, reasons it is expected that the indexer 10 of the present invention will have widespread industrial applicability and that the commercial utility of the present invention will be extensive and long lasting.

I claim:

1. An improved step motor and servo motor indexer of the type having a control unit and a user interface, which includes a display and a data entry means for selectably programming said control unit, wherein the improvement comprises said data entry means comprising:
   a. a rotary device, which produces a first signal component that is transmitted to said control unit, for user input to said control unit of data which will be presented on said display for later confirmation; and
   b. a toggle device, which produces a second signal component representing a bi-modal state change, which is transmitted to said control unit, for confirming that said indexer is to use data currently presented on said display.

2. The indexer of claim 1, wherein said rotary device and said toggle device are integrated into a single rotatable and toggleable component.

3. The indexer of claim 1, wherein said rotary device is chosen from the set consisting of: shaft-position encoders, rotary switches, potentiometers, rheostats, tachometers, and resolvers.

4. The indexer of claim 1, wherein said rotary device further includes user overcomeable means for maintaining rotational position, to prevent spurious change in position of said rotary device.

5. The indexer of claim 4, wherein said means for maintaining rotational position includes a plurality of mechanical detents which correspond to incremental content of a signal produced by said rotary device.

6. The indexer of claim 4, wherein said means for maintaining rotational position includes a friction means.

7. The indexer of claim 1, wherein the improvement further comprises said control unit of the indexer including ballistic means for interpreting time varying content of said first signal component of the rotary device as a user input parameter, to permit user input of scale data by selectably varying rotational speed of said rotary device.

8. A step motor and servo motor indexer, comprising:
   a. a control unit, for suitably directing the operations of the indexer;
   b. a system interface, for communicating
      1) input signals to said control unit of the indexer,
      2) output signals from said control unit of the indexer, and
      3) power needs of the indexer;
   c. a user interface, including
      1) a display, for presenting messages from said control unit to users, and
      2) data entry means, for receiving input datum from users, said data entry means including
         a) a rotary device, which produces a shaft-position state change first signal component which is transmitted to said control unit, and
         b) a toggle device, which produces a single binary mode state change second signal component which is transmitted to said control unit;
   d. structure means, for suitably maintaining said control unit, system interface, and user interface in spatial and operable relationship.

9. The indexer of claim 8, wherein said rotary device and said toggle device of the user interface are integrated into one component, for data entry into said control unit.

10. The indexer of claim 8, wherein said rotary device is chosen from the set consisting of: shaft-position encoders, rotary switches, potentiometers, rheostats, tachometers, and resolvers.

11. The indexer of claim 8, wherein said rotary device further includes user overcomeable means for maintaining rotational position, to prevent spurious change in position of said rotary device.

12. The indexer of claim 11, wherein said means for maintaining rotational position includes a plurality of mechanical detents which correspond to incremental content of a signal produced by said rotary device.

13. The indexer of claim 11, wherein said means for maintaining rotational position includes a friction means.

14. The indexer of claim 8, wherein said control unit further includes ballistic means for interpreting the varying content of said first signal component of the rotary device as a user input parameter, to permit user input of scale data by selectably varying rotational speed of said rotary device.

15. A user interface programming input system for a step motor and servo motor indexer including a control unit which suitably directs operation of the indexer, a display for reporting program and operating information to users of the indexer, a system interface which communicates input signals, output signals, and power needs for the indexer, and structure means which houses the indexer, the input system comprising:

a. data entry means, for receiving input datum from users, said data entry means including
  1) a rotary device, which produces a shaft-position state change first signal component which is transmitted to said control unit, and
  2) a toggle device, which produces a single binary mode state change second signal component which is transmitted to said control unit.

16. The indexer of claim 15, wherein said rotary device and said toggle device of the input system are integrated into one component, for data entry into said control unit.

17. The indexer of claim 15, wherein said rotary device is chosen from the set consisting of: shaft-position encoders, rotary switches, potentiometers, rheostats, tachometers, and resolvers.

18. The indexer of claim 15, wherein said rotary device further includes user overideable means for maintaining rotational position, to prevent spurious change in position of said rotary device.

19. The indexer of claim 18, wherein said means for maintaining rotational position includes a plurality of mechanical detents which correspond to incremental content of a signal produced by said rotary device.

20. The indexer of claim 18, wherein said means for maintaining rotational position includes a friction means.

21. The indexer of claim 15, wherein said control unit further includes ballistic means for interpreting time varying content of said first signal component of the rotary device as a user input parameter, to permit user input of scale data by selectably varying rotational speed of said rotary device.

* * * * *